United States Patent
Jensen et al.

(10) Patent No.: US 10,837,770 B2
(45) Date of Patent: Nov. 17, 2020

(54) SURFACE MEASUREMENT BY MEANS OF EXCITED FLUORESCENCE

(71) Applicant: HEXAGON TECHNOLOGY CENTER GMBH, Heerbrugg (CH)

(72) Inventors: Thomas Jensen, Rorschach (CH); Zheng Yang, Friedrichshafen (DE); Johan Stigwall, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 16/442,466

(22) Filed: Jun. 15, 2019

(65) Prior Publication Data

US 2019/0383605 A1    Dec. 19, 2019

(30) Foreign Application Priority Data

Jun. 15, 2018 (EP) ..................................... 18178026

(51) Int. Cl.
*G01J 3/00* (2006.01)
*G01C 3/08* (2006.01)
(Continued)

(52) U.S. Cl.
CPC ........... *G01C 3/08* (2013.01); *G01N 21/6447* (2013.01); *G01B 11/005* (2013.01)

(58) Field of Classification Search
CPC ...... G01J 3/02; G01J 3/28; G01J 3/42; G01N 21/31; G01N 21/552
(Continued)

(56) References Cited

U.S. PATENT DOCUMENTS

| 5,388,342 A | 2/1995 | Garau et al. |
| 5,402,582 A | 4/1995 | Raab |

(Continued)

FOREIGN PATENT DOCUMENTS

| DE | 43 25 337 A1 | 2/1994 |
| DE | 43 25 347 A1 | 2/1994 |

(Continued)

OTHER PUBLICATIONS

European Search Report dated Sep. 7, 2018 as receieved in Application No. 18178026.3.

*Primary Examiner* — Md M Rahman
(74) *Attorney, Agent, or Firm* — Maschoff Brennan

(57) ABSTRACT

A measuring device for measuring an object. The measuring device includes a distance measuring unit having a beam emission unit generating a measurement radiation having a defined wavelength spectrum and a detector detecting the measurement radiation reflected on the object surface, the detector having at least one first sensor. The distance measuring unit generates distance measured data and reflection measured data as first distance measured data by emitting the measurement radiation and detecting the reflected measurement radiation according to the principle of triangulation. The measurement radiation is generated using a wavelength spectrum such that a fluorescence is excitable by an interaction of the measurement radiation with the object material to emit fluorescent light, wherein a spectrum of the fluorescent light and the wavelength spectrum of the measurement radiation are different.

15 Claims, 5 Drawing Sheets

(51) Int. Cl.
*G01N 21/64* (2006.01)
*G01B 11/00* (2006.01)

(58) Field of Classification Search
USPC .......................................................... 356/300
See application file for complete search history.

(56) References Cited

U.S. PATENT DOCUMENTS

| | | |
|---|---|---|
| 9,127,929 B2 | 9/2015 | Siercks et al. |
| 2010/0111353 A1* | 5/2010 | Yazdanfar ............ G02B 26/008 382/100 |
| 2013/0120712 A1 | 5/2013 | Spasovski |
| 2013/0204392 A1* | 8/2013 | Law ....................... A61K 35/32 623/23.72 |
| 2016/0124208 A1* | 5/2016 | Best ................... G02B 21/0076 359/363 |
| 2017/0010356 A1* | 1/2017 | Demirel .................. G01S 17/08 |
| 2017/0365065 A1* | 12/2017 | Stigwall ................... G06T 7/40 |
| 2018/0252514 A1* | 9/2018 | Pandev ..................... G06T 7/60 |

FOREIGN PATENT DOCUMENTS

| | | |
|---|---|---|
| DE | 10 2005 061 464 A1 | 7/2007 |
| DE | 10 2016 105 426 A1 | 9/2017 |
| EP | 1 474 650 B1 | 6/2007 |
| EP | 2 037 214 A1 | 3/2009 |
| FR | 2 738 343 A1 | 3/1997 |
| WO | 2016/127173 A1 | 8/2016 |

* cited by examiner

SURFACE MEASUREMENT BY MEANS OF EXCITED FLUORESCENCE

CROSS-REFERENCE TO RELATED APPLICATIONS

This application claims priority to European Patent Application No. 18176796.3, filed on Jun. 15, 2018. The foregoing patent application are incorporated herein by reference.

FIELD OF INVENTION

The invention relates to a measuring device and a method for measuring object surfaces based on a hybrid measuring technology utilizing a fluorescence effect.

BACKGROUND

In many technical areas of application, the requirement exists of measuring objects at high accuracy or with respect to the composition thereof. This applies in particular to the manufacturing industry, for which the measurement and checking of surfaces of workpieces has a high level of significance, in particular also for the purposes of quality control.

Coordinate measuring machines, for example, which enable a precise measurement of the geometry of an object surface, typically at micrometer accuracy, are used for such applications. Objects to be measured can be engine blocks, transmissions, and tools, for example. Known coordinate measuring machines measure the surface by establishing a mechanical contact and scanning the surface. Examples thereof are gantry measuring machines as described, for example, in DE 43 25 337 or DE 43 25 347. Another system is based on the use of an articulated arm, the measuring sensor of which, which is arranged at the end of the multipart arm, can be moved along the surface. Generic articulated arms are described, for example, in U.S. Pat. No. 5,402,582 or EP 1 474 650.

Coordinate surface measuring permits the establishment of geometric deviations on the workpiece from corresponding target values. A high-accuracy specification for manufacturing precision can thus be made with respect thereto. It can thus be established whether shape and dimensioning of the produced part lie within a specified tolerance and the component is to be considered to be a discard or a good part.

In the prior art, a tactile sensor is used, for example, as a standard measuring sensor with such coordinate measuring devices, said tactile sensor consisting of a ruby sphere which is mounted on a measuring rod. The deflection of the tactile sensor, in the case of a coordinate measuring machine designed for three-dimensional measurements in three directions X, Y, and Z perpendicular to one another, is determined during the scanning via a switch element or distance-measuring element. The location of the contact and therefore the surface coordinates are calculated on the basis of the switching point or deflection distance.

Furthermore, approaches for contactless measurement, in particular using optical sensors, are known. By means of such an optical sensor, surface topographies can be measured very precisely using an emitted measurement light beam, in particular a laser beam. The resolution for measuring surface profiles using optical measuring sensors can be significantly higher than that using tactile measuring sensors. Optical sensors introduced in the meantime into metrology using coordinate measuring machines are based, for example, on emission of laser light onto an object surface for interferometric measurements (EP 2 037 214). Methods based on white light interferometry (DE 10 2005 061 464) and chromatic-confocal methods (FR 273 8343) have also been proposed.

An approach which is also efficient for optical surface measurement is based on the use of an optical sensor, the measurement functionality of which is based on the principle of triangulation. For this purpose, measurement radiation is oriented onto the object to be measured and diffusely scattered on this object. Parts of the emitted measurement light are detected using a detector at the sensor after corresponding reflection on the object surface at a specific angle. A sensor of the detector can capture a depiction of the illumination resulting due to the incidence of the measurement radiation on the object surface for this purpose (for example, as an image). A distance can be computed on the basis of a location of the depicted illumination in the image from the known relative arrangement of beam emitter and detector.

The measurement radiation can be emitted in the form of a line and the image sensor for imaging the projected lines can be designed as a surface sensor. In this way, not only can an item of distance information be generated at one point, but rather a plurality of measured values can be detected.

Such a triangulation sensor can furthermore be designed as a scanner. In this embodiment variant, the measurement radiation can be guided in a scanning movement over the surface to be measured, whether as a moving point or line, while corresponding distances are derived on the basis of the reflections resulting in this case. The distance measured data (for example, Z coordinates) are then associated with respective lateral object positions (X and Y coordinates) in accordance with the relative movement in relation to the object surface. As a result of this measurement, a point cloud can be obtained, which can represent the measured object surface with respect to spatial dimensions and shape.

In general, one advantage of the use of a triangulation sensor is the comparatively high measuring speed and the simultaneously contactless measurement.

One disadvantage of the measuring principle results, for example, in the requirement of measuring surfaces which are not diffusely reflective or are only diffusely reflective to a limited extent. For example, if a reflective or transparent region of an object is to be measured, the reflection required for this purpose of at least a part of the measurement radiation in the direction of the detector can be absent, since typically diffuse scattering or reflection does not take place on the surface. A measurement can only succeed here, for example, in a special arrangement of the sensor in relation to the surface, in which it is typically not present or guided, however.

Moreover, diffuse scattering because of surface flaws such as scratches or dust can dominate, whereby the accuracy of the measurement can be strongly reduced.

A further disadvantage follows accordingly for the measurement of an object, the surface of which is only diffusely reflective in parts and in other parts is reflective or transparent. For an optical measurement of such a surface, very specific boundary conditions have to be met locally in each case. This is linked to great technical effort and results in a correspondingly long measuring time.

The above limitations cause an optical (triangulation) sensor to appear unsuitable for measuring numerous parts from the field of automobile construction or aircraft construction.

It is therefore the object of some aspects of the present invention to provide an improved measuring device for the surface measurement of an object, wherein the above disadvantages can be overcome or reduced.

It is in particular object of some aspects the present invention to specify a measuring device which provides enhanced robustness and reliability, in particular a broader area of use, with respect to a surface measurement.

This object is achieved by the implementation of the characterizing features of the independent claims. Features which refine the invention in an alternative or advantageous manner can be inferred from the dependent patent claims.

Some embodiments of the invention are based on the concept of, in addition to a typical triangulation measurement by means of reflected measurement radiation, for example, laser radiation, using the effect of fluorescence and fluorescent radiation emitted in this case to generate additional distance information by means of the fluorescent radiation. The fluorescent radiation is accordingly captured using a detector (having, for example, a CCD or CMOS) located in a known arrangement in relation to the beam source in such a way that fluorescence-based distance measured data are also derivable according to the principle of triangulation.

In particular plastic-based or glass-based materials absorb light in the UV range or in the spectral range of violet or blue light, whereby electrons in the material briefly occupy a higher energy level and fall back into the original level again. Due to the return into the lower level, the absorbed energy is then emitted again in the form of a spontaneous emission of florescent light. The fluorescent light has a greater wavelength than the radiation used for the excitation. Therefore, radiation originating from transparent or reflective glass or plastic surfaces can be generated and detected by means of adapted detection.

Thus, for example, surfaces which are provided with a reflective or non-diffusely-reflective coating can become accessible to a corresponding measurement.

By way of example, furthermore materials such as polymethylmethacrylate (PMMA, acrylic glass) or polyethylene terephthalate (PET) and glass-ceramic materials are mentioned. The absorption spectra thereof are formed in such a way that a comparatively large absorption capacity is provided for electromagnetic radiation in the UV, violet, or blue spectral range and fluorescence is induced and/or excited upon absorption of corresponding radiation. The excitation of fluorescence is based in this case on the character of the organic compounds present in the materials.

As already indicated, radiation having a central wavelength in the blue or ultraviolet range between approximately 250 nm and 450 nm is preferably used to excite the fluorescence.

In general, those materials which have a sufficiently high coefficient of absorption for the measurement wavelength used and a sufficiently high coefficient of emission for the fluorescence are measurable using such an embodiment.

Furthermore, a differentiation of the detected radiation can be performed using the approach according to the invention. This results in a significantly more reliable and accurate distance measurement on the basis of the different origins and properties of the radiations originating from the object. The reflected measurement light is reflected on the surface, whereby the reference point for a triangulation measurement is directly a surface point on the object. However, the fluorescent light arises in large parts in the interior of the object material, whereby a reference point for distance measurements can no longer be unambiguously associated with the surface. Moreover, a spatial length profile of the measurement radiation (for example, Gaussian profile) typically differs from that of the fluorescent radiation (broader profile having falling intensity with respect to the penetration depth of the measurement radiation into the material).

A differentiation of the detected radiations is therefore advantageous for deriving accurate distance values.

Some aspects of the invention thus relate to a hybrid measuring device for measuring an object, wherein the measuring device comprises a distance measuring unit. The distance measuring unit has a radiation emission unit configured to generate a measurement radiation having a defined wavelength spectrum and a detector configured for detecting the measurement radiation reflected, in particular diffusely reflected, on the object surface, having at least one first sensor. The distance measuring unit is furthermore designed to generate distance measured data, wherein reflection measured data can be generated as first distance measured data by means of emission of the measurement radiation and detection of the reflected measurement radiation according to the principle of triangulation.

The measurement radiation can be generated having a wavelength spectrum such that a fluorescence can be generated and fluorescent light can be emitted by an interaction of the measurement radiation with the object material. The ability to excite the fluorescence is generally also dependent on which material the object comprises. Therefore, in particular a tuning of the wavelength of the incident measurement radiation to the object material is indicated for generating a fluorescence. It is preferably at least partially known which materials the object to be measured is manufactured or constructed from, and the measurement radiation used is selected accordingly. A spectrum of the fluorescent light and the wavelength spectrum of the measurement radiation are preferably different.

The detector is moreover designed for detecting the fluorescent light, i.e., as sensitive to light of the fluorescence wavelength. Fluorescence measured data can thus be generated as second distance measured data based on the detection of the fluorescent light (by means of triangulation).

The sensor can be designed, for example, as a planar image sensor (CCD or CMOS). Therefore, upon projection of the measurement radiation as a light line, an item of distance information can be generated not only for one measurement point but rather for a plurality of measurement points along the lines. The information is derivable as a line from a location and from a curve of the measurement radiation detected using the sensor in an image and reflected on the object.

The detector can comprise an optical assembly, in particular an objective lens, having one or a plurality of optical components (for example, lens, aperture, etc.). The detector is designed in particular as a camera.

In one embodiment, a center wavelength of the wavelength spectrum can be selected from a range between 250 nm and 500 nm, in particular it can be 450 nm. The wavelength of the measurement radiation is preferably in the visual blue range (around 450 nm). The measurement radiation is generated in this case, for example, by means of a laser diode. Alternatively, the wavelength can be assigned to the UV range, i.e., for example, it can be <400 nm. A fluorescence may be generated in particular in polymer-based or plastic-based materials, but also in glasses, using the mentioned wavelengths.

The detector of the measuring device can comprise a first optical filter component, wherein the first optical filter component provides a wavelength-dependent separation of reflected measurement radiation and fluorescent light in cooperation with the first sensor. The filter is thus capable of effectuating a separation of the two radiations originating from the object. This is advantageous in particular if both a diffuse reflection of the radiation occurs and also a fluorescence is excited upon incidence of the measurement radiation and thus distance measured data can be generated by means of both approaches. In particular, the first optical filter component is designed as a spatially distributed multicolor filter, in particular an RGB filter. This can also be a component of the surface sensor in the form of an RGB matrix.

The filter can be a composition of multiple spatially distributed pixel-level color filters, which have different transmission spectra, or can be implemented using a color camera having Bayer pattern.

In one variant, the detector can comprise a second optical filter component, wherein the second optical filter component is designed as a two-part alternating filter having a first and a second filter region. The second optical filter component can be provided alternatively or additionally to the first optical filter component. The first filter region provides a substantially exclusive transmissivity with respect to the wavelength spectrum, in particular for the center wavelength of the wavelength spectrum. The second filter region provides a transmissivity with respect to a spectrum of the fluorescent light. The first and the second filter region can be positioned alternately, in particular sequentially, in a field of view of the first sensor. The light incident in the detector can thus be filtered if needed in such a way that either fluorescent radiation or only reflected measurement radiation is incident on the sensor. The filter component can be manually operated or positioned automatically or in a controlled manner.

The beam emission unit can furthermore comprise a first and a second beam source and the measurement radiation can be generable as a composition, in particular an overlay, of the measurement radiation, which can be generated using the first beam source, having the defined wavelength spectrum and a further measurement radiation, which can be generated using the second beam source, having a further wavelength spectrum different from the defined wavelength spectrum.

In addition to the use of two beam sources, a single beam source can be provided, which emits, for example, measurement radiation at two different wavelengths.

In this way, a separation (with respect to the wavelength) of fluorescence-exciting radiation and radiation to be reflected can already be provided at the emitter. The detector can be designed, for example, for detecting light of a measurement wavelength (for example, by means of a matching filter), wherein a generation of fluorescence is not to be expected for this wavelength, for example, but rather a reflection. Alternatively, the detector can be designed, for example, for detecting a fluorescence.

In this context, the distance measuring unit can be designed for activation of the first and the second beam source in such a way that the measurement radiation having the defined wavelength spectrum and the measurement radiation having the further wavelength spectrum (fluorescent radiation) can be alternately emitted sequentially at specific intervals. The distance measuring unit can moreover be designed for activation of the detector in such a way that a first detection and a second detection can be carried out sequentially and synchronized with the activation of the first and the second beam source. In this way, the detector can be designed, for example, for detecting both radiation phenomena (reflection and fluorescence), but a detection can be synchronized with the respective emission so that only fluorescent light or reflected light is detected with an image detection and a differentiation of the detected radiations can be carried out unambiguously.

The detector can comprise a second sensor and can be configured in such a way that the reflected measurement radiation is detectable using the first sensor and the fluorescent light is detectable using the second sensor, in particular wherein one filter unit is associated with each of the first and the second sensor and the respective filter unit is transmissive substantially exclusively with respect to the reflected measurement radiation or the fluorescent light, respectively.

The detector can comprise a dichroic or dichromatic beam splitter and the beam splitter can be designed for the wavelength-dependent separation of the reflected measurement radiation from the fluorescent light.

In general, other types of beam splitters or filters are also conceivable, which act, for example, according to the principle of interference.

In one embodiment, the sensor comprises a first and a second, in particular spatially separated, detection region and the detector can be configured in such a way that the reflected measurement radiation is detectable by interaction with the first detection region and the fluorescent light is detectable by interaction with the second detection region. The respective radiation components can be deflected for this purpose onto the respective detection regions.

According to some aspects of the invention, the measuring device can comprise a control and processing unit, which is configured in particular to execute a method described hereafter.

The control and processing unit can comprise a data fusion functionality configured in such a way that upon its execution, the detection of the measurement radiation and the fluorescent light is continuously monitored, a respective item of intensity information for the respective detection of the measurement radiation and the fluorescent light is continuously derived, and a point cloud representing the object surface is generated by selective processing of the reflection measured data and the fluorescence measured data based on the intensity information, in particular wherein the distance measured data, for which a greater intensity is derived, is processed for a respective object point.

The database can thus be used for each detected region of the object surface from which the more accurate and complete depiction of the surface may be expected.

The control and processing unit can furthermore comprise a switchover functionality configured in such a way that upon its execution, the measurement radiation or the fluorescent light is continuously detected, corresponding reflection measured data or fluorescence measured data, respectively, are generated, the detection of the measurement radiation or the fluorescent light is continuously monitored with respect to a signal intensity, the signal intensity is continuously compared to a defined threshold value, and a switchover between the detection of the measurement radiation and the detection of the fluorescent light takes place in dependence on the comparison.

Thus, if it is to be established that no fluorescence signal is detectable, a corresponding switchover to reflection measurement can take place and vice versa.

Some aspects of the invention moreover relate to a hybrid measuring method for measuring an object comprising a material which fluoresces with respect to a known wavelength range. The measuring method comprises at least generating and emitting a measurement radiation having a defined wavelength spectrum, scanning illuminating of an object region using the measurement radiation, detecting the measurement radiation reflected, in particular diffusely, on the object surface, and generating reflection measured data as first distance measured data based on the detection of the reflected measurement radiation according to the principle of triangulation.

In the scope of the measuring method, the measurement radiation is generated having a wavelength spectrum such that in the scope of the scanning illumination, a fluorescence is excited by an interaction of the measurement radiation with the object material and fluorescent light is emitted at the object. The fluorescent light is detected and fluorescence measured data are generated as second distance measured data based on the detection of the fluorescent light according to the principle of triangulation.

In one embodiment, a reflection point cloud can be generated based on the reflection measured data and a fluorescence point cloud can be generated based on the fluorescence measured data. A representation of the object surface can then be generated by a combination of the reflection point cloud and the fluorescence point cloud. A data fusion can thus be carried out, wherein as a result the surface of a partially transparent object can be completely imaged by the optical, contactless measurement.

In particular, the reflection measured data and the fluorescence measured data can be analyzed with respect to the respective form, quality, or density thereof with regard to the detection of the object region depending on the location, wherein a segmentation of the object region can be carried out based on the analysis. A combination of at least a part of the reflection measured data and of at least a part of the fluorescence measured data can then be carried out based on the segmentation.

Some aspects of the invention furthermore relate to a computer program product, which is stored on a machine-readable carrier or is embodied by an electromagnetic wave, for the control and/or execution of at least the steps of detecting the reflected measurement radiation, generating reflection measured data, detecting the fluorescent light, and generating fluorescence measured data of an above measuring method. The computer program product can be executed in particular on a control and processing unit of a hybrid measuring device.

BRIEF DESCRIPTION OF THE DRAWINGS

The method according to the invention and the device according to the invention are described in greater detail solely by way of example hereafter on the basis of specific exemplary embodiments schematically illustrated in the drawings, wherein further advantages of the invention are also discussed. In the specific figures.

DETAILED DESCRIPTION

Figure 1:
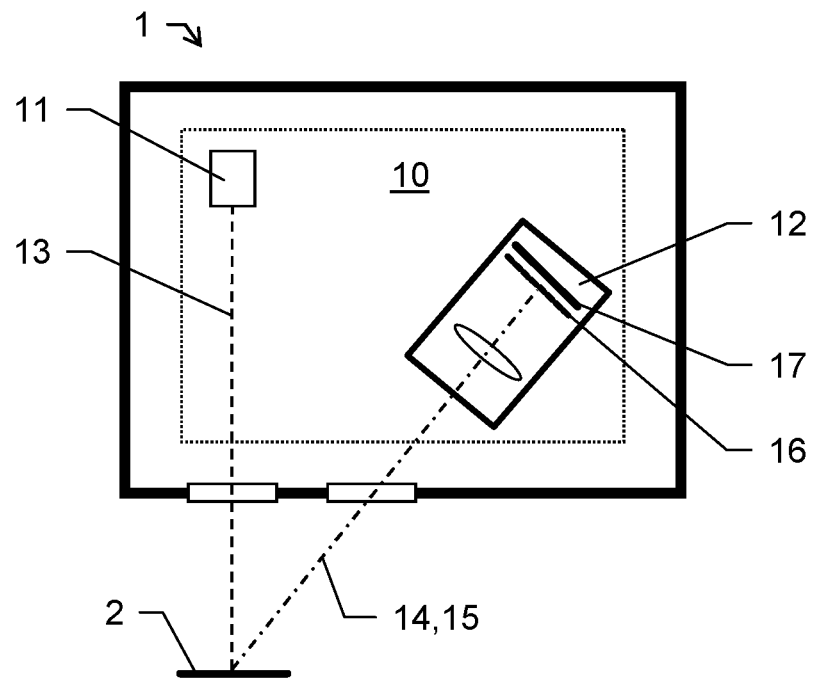
FIG. 1 shows one embodiment of a measuring device according to the invention for measuring an object.

FIG. 1 shows an embodiment of a measuring device 1 according to the invention for measuring an object 2. The measuring device 1 comprises a distance measuring unit 10, which is designed for generating measured data by means of triangulation. The distance measuring unit 10 in turn comprises a beam emission unit 11 and a detector 12. The beam emission unit 11 and the detector 12 are arranged in a known position and orientation in relation to one another.

The beam emitter 11 is designed for emitting measurement radiation 13, in particular laser radiation. A specific illumination of the object 2 can be provided using the measurement radiation 13. For example, the measurement radiation 13 can be generated in the form of a line and a corresponding light line can be projected on the object 2.

The measurement radiation 13 is generated here as blue laser radiation having a wavelength of 450 nm.

The object 2 to be measured comprises material at least in sections which can be excited to emit fluorescent light.

The absorption spectrum of said object material is formed in such a way that the fluorescence can be excited here in particular by means of irradiation using electromagnetic radiation having a wavelength from a wavelength range of 250 nm to 500 nm, in particular 300 nm to 450 nm. Such a fluorescence behavior applies to numerous plastic-type or plastic-based materials. The wavelength of the exciting measurement light is therefore preferably to be selected from the ultraviolet or blue spectral range.

The measurement radiation 13 is incident on the object and interacts with the object material. In dependence on the respective measurement property of the currently irradiated object section, i.e., whether the object section is diffusely reflective or a fluorescence is excited or both effects occur simultaneously, a part of the measurement radiation 13 is reflected as reflection radiation 14 in the direction of the detector 12 and/or the measurement radiation 13 is (at least partially) absorbed and fluorescent radiation 15 is emitted on the part of the object. The fluorescent radiation 15 is also detectable using the detector 2.

In the measurement example shown, measurement radiation is diffusely reflected and also fluorescence is excited. Thus, both reflected measurement radiation 14 and also fluorescent light 15 are detectable using the detector 12. Both signals can be sampled by means of a multicolor filter 16 connected in front of the sensor 17, for example, an RGB filter, and selectively detected. Such a filter 16 provides a wavelength-dependent separation of the signals. The fluorescent light has a longer wavelength in comparison to the (reflected) measurement radiation.

In this way, the measuring arrangement 1 enables the generation of distance measured data from both directly reflected measurement radiation and also based on emitted fluorescent light. If the measurement radiation is incident, for example, as a line on the object 2, a line can thus be detected on the part of the detector 2 on the object surface 2 in a wavelength spectrum corresponding to the emitted measurement radiation 13 and an (excited) line can be detected having a different wavelength spectrum. Respective images on the sensor 17 may be associated with the respective measurement principles (reflection and fluorescence) on the basis of the different spectral characteristics.

Figure 2:
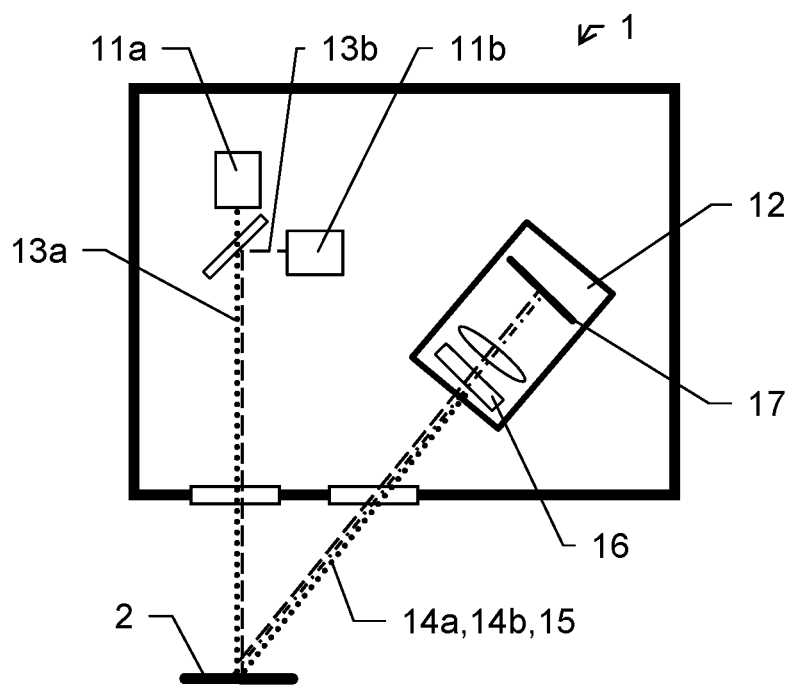
FIG. 2 shows a further embodiment of a measuring device according to the invention for measuring an object.

FIG. 2 shows a further embodiment of a measuring device 1 according to the invention for measuring an object 2. The measuring device 1 comprises a first beam source 11a and a second beam source 11b. The first beam source 11a is designed for emitting fluorescence-induced measurement radiation 13a having a wavelength in the blue or ultraviolet spectral range, in particular as a laser diode. The second beam source 11b is designed for emitting a second longer-wavelength measurement radiation 13b, for example, in the red spectral range, in particular also as a laser diode.

The beam guide for the respective emitted radiations can be designed in such a way that both measurement radiations 13a and 13b are emitted coaxially or parallel with respect to a common optical axis. Such a combination of the beams can be provided, for example, by means of a partially-transmissive deflection element (for example, beam splitter). Both beam bundles are thus incident, for example, at the identical position or having a defined parallel offset on the object surface.

While the second measurement radiation 13b for a direct triangulation measurement can be emitted by means of beam reflection, the first measurement radiation 13a is provided for inducing possible fluorescence effects. In the example shown, both direct reflection of the second measurement radiation 13 and also induction of fluorescence occur.

Therefore, a reflected part of the first measurement radiation 14a and the second measurement radiation 14b and also the fluorescent radiation 15 arising due to the interaction with the first measurement radiation 13a result as radiation components emitted and/or reflected from the object 2 as a result of the illumination using both measurement radiations 13a and 13b. These three components radiate through a viewing window into the measuring device 1 and are incident on the detector 12.

A filter element 16 having a transmissivity for radiation corresponding to the fluorescence spectrum and the spectrum of the second measurement radiation is provided. The wavelength of the second measurement radiation is preferably selected so that it lies within the fluorescence spectrum to be expected.

The sensor 17 is designed for detecting corresponding radiation.

The first and the second radiation source 11a and 11b can be modulated in such a way that the measurement radiations 13a and 13b thereof are emitted alternately and sequentially, i.e., either only the first 13a or the second measurement radiation 13b is always emitted. The detector 12 in turn can correspondingly be modulated in such a way that—synchronized with alternating emission of the two measurement radiations—alternately (sequentially) two exposures of the sensor are detected. A respective detection of a sensor illumination can thus either be associated with the reflection measurement or the fluorescence measurement.

The wavelength of the second measurement radiation 13b is in this case such that upon an illumination of the object using this radiation, no fluorescence preferably occurs. In particular, a red laser line is generated using the second beam source 11b and a blue laser line is generated using the first beam source 11a.

The camera 12 can thus detect light of both wavelengths and can thus make directly reflected light and fluorescence measurable. Surfaces which do not comprise fluorescence, for example, metallic surfaces, can thus also be measured. The wavelength of the beam source 11b is preferably not excessively close to the fluorescence-exciting wavelength.

The second radiation source 11b thus provides in particular the emission of a second laser having a longer wavelength (with respect to the first beam source 11a), so that a reflection which can be generated thereby (without fluorescence) is measurable using the same camera 12.

Figure 3:
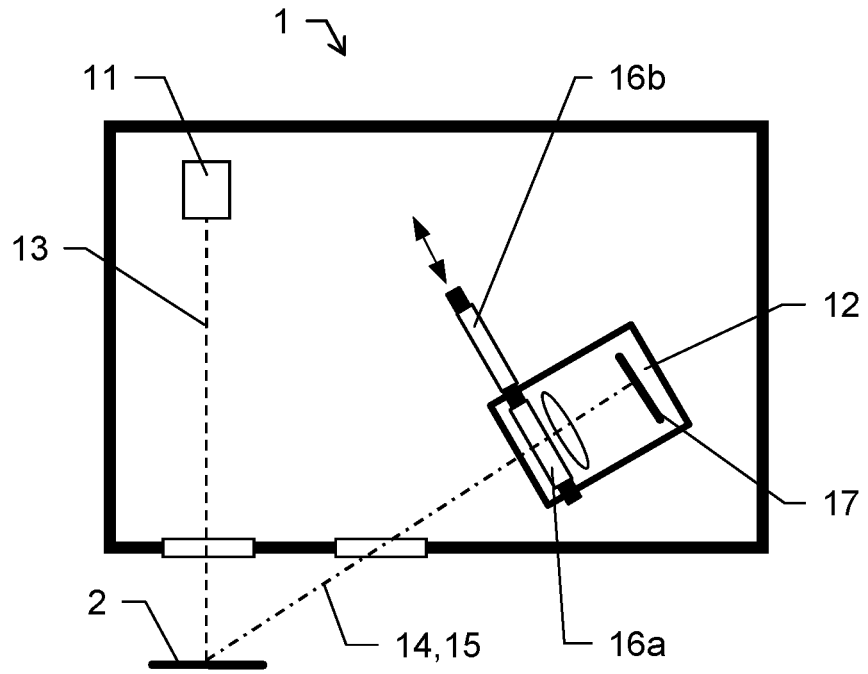
FIG. 3 shows a further embodiment of a measuring device according to the invention for measuring an object.

FIG. 3 shows a further embodiment of a measuring device 1 according to the invention for measuring an object 2. The beam emission unit 11, the possible interactions with the object 2, and the emission of measurement light from the object 2 essentially correspond to the embodiment according to FIG. 1.

The embodiment differs with respect to the detection of the measurement radiations 14 and 15 comprising the object information. The detector 12 comprises a single sensor 17, which is designed for detecting light having a measurement radiation spectrum, in particular a central measurement radiation wavelength, and having a fluorescence spectrum, which is broader band in particular.

To separate the respective signals, the detector 12 comprises a filter unit having two filter elements 16a and 16b. The filter elements 16a and 16b can alternately be introduced into the beam path or into the course of the optical axis of the detector or sensor. The action of the elements 16a and 16b in the detector can be mutually exchanged multiple times. This can take place manually or controlled (automatically) by means of a mechanical positioning device.

A sequential exchange of the filter elements can take place in particular in dependence on the measurement method (reflection or fluorescence) to be used.

For example, an object can firstly be measured using the typical triangulation approach utilizing a diffuse reflection of the measurement radiation on the object. If it is then established in the course of the measurement that signals having low, inadequate intensity are measured on the detector or an intensity level drops significantly (strongly and rapidly), this can be an indication of reaching a transparent or reflective object region. Furthermore, an operator of the measuring device can establish, for example, individually (by visual evaluation of the object 2) that a transparent region is to be measured. In reaction to one of the above determinations, a change of the filter 16a or 16b, respectively, heretofore used can then be initiated or carried out. Following the change, a corresponding measuring functionality of the device can also be changed, for example, from reflection measurement to fluorescence measurement.

A differentiation of the received radiations, i.e., of reflection and fluorescent radiation, is relevant for the determination of distance data according to the principle of triangulation, since the reflection radiation is radiated from the object surface, but the fluorescent radiation largely arises in lower-lying material layers, however, and this radiation origin is to be considered accordingly for the signal analysis. For the analysis of fluorescent light, in particular specific calibration parameters are stored, which also permit an exact determination of the object surface on the basis of the fluorescent light.

Moreover, the differentiation of the signals for the signal processing and analysis is relevant because the spectrum of a reflected measurement radiation, in particular if a laser is used, is comparatively well-defined, but the spectrum upon the occurrence of fluorescent light deviates significantly therefrom.

In the standard mode, i.e., using a beam reflection, a symmetrical, thin laser line is typically projected and an image of the lines is detected on the part of the detector after reflection on the object. The intensity profile with respect to the image of the lines is typically Gaussian here. The position of the intensity maximum reflects the relevant height coordinate on the object and can be determined by means of Gaussian or parabolic approximation.

For the distance determination by means of fluorescent light, an analysis adapted to the fluorescence spectrum is required. An analysis on the basis of a determination of an intensity maximum or intensity focal point—as typically takes place in classical reflection—can lead to flawed results here, since the intensity distribution is dependent on the penetration depth of the fluorescence-exciting radiation and thus on the occurrence location of the fluorescence. The intensity focal point thus does not correlate with the object surface, but rather is typically to be assigned to a lower-lying material layer.

Figure 4:
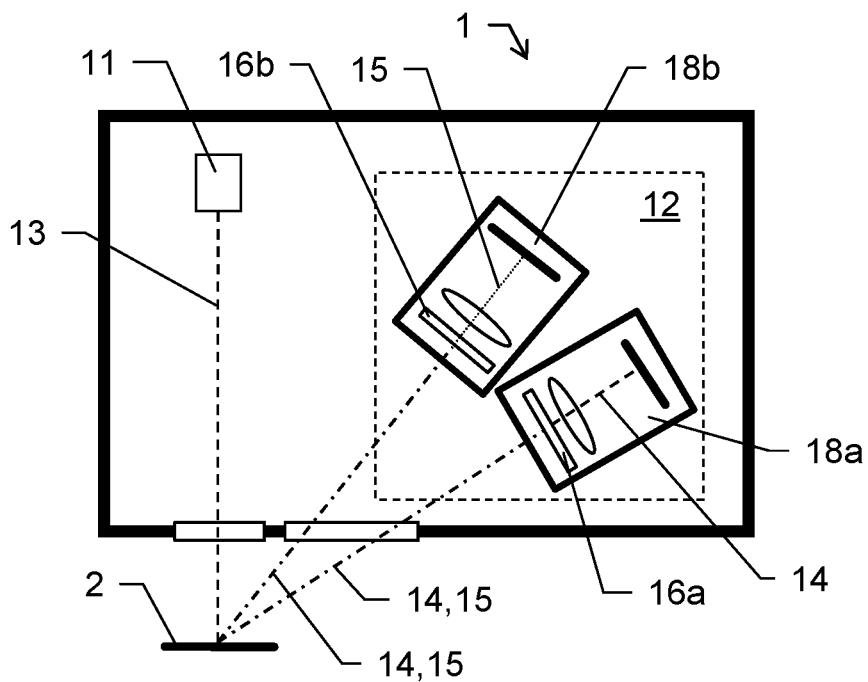
FIG. 4 shows a further embodiment of a measuring device according to the invention for measuring an object.
Figure 8:
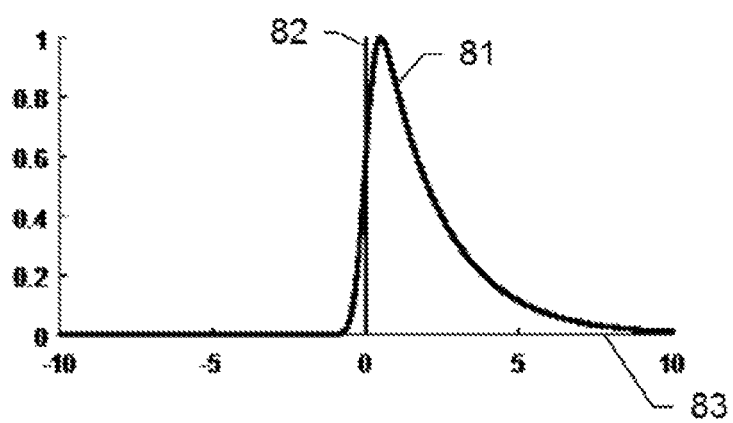
FIG. 8 shows a model of an intensity distribution in the case of fluorescence for data analysis.

FIG. 8 shows for this purpose, by way of example, an intensity distribution 81 of a fluorescence, as can be detected during measurement of an object which can be excited to fluorescence using a sensor 12 of the measuring device 1. The emitted fluorescent light is collected using the sensor and/or a specific camera chip. The intensity is plotted over the penetration depth 83 (here: measured in millimeters) of the radiation into the object material. The lines 82 mark the coordinates of the material surface. As can be seen, the location of the intensity maximum or the intensity focal point does not correspond to a point on the object surface, but rather would indicate a coordinate in the interior of the object. The analysis of the measurement points detected by means of fluorescence is therefore preferably carried out with application of this or a similar model. FIG. 4 shows a further embodiment of a measuring device 1 according to the invention for measuring an object 2. The embodiment differs from that of FIG. 3 solely at the detector.

The detector 12 comprises two cameras 18a and 18b. Each of the cameras 18a and 18b in turn has one sensor, one optical assembly, and one filter element 16a or 16b, respectively. The filter elements 16a and 16b differ with respect to the transmissivity of electromagnetic radiation.

The filter 16a is transmissive to light of the measurement wavelength and thus also to its reflections 14. This filter can accordingly be designed as narrowband if a laser beam source is used, to minimize or exclude possible external beam influences.

The filter 16b is designed for a transmissivity of generated fluorescent light 15. This filter 16b can be adapted in particular to measuring an object having a specific material, i.e., if the material properties of an object 2 and an excitable fluorescence behavior linked thereto are known, the filter 16b can be designed as appropriately transmissive accordingly. It is typically a broader band transmissivity range—in comparison to filter 16a.

The respective camera sensor can accordingly be adapted to the detection of reflection light or fluorescent light, respectively, for example, it can be sensitive in a specific wavelength range.

The configuration thus provides a simultaneous derivation of fluorescence measured data (by means of the camera 18b) and reflection measured data (by means of the camera 18a).

Figure 5:
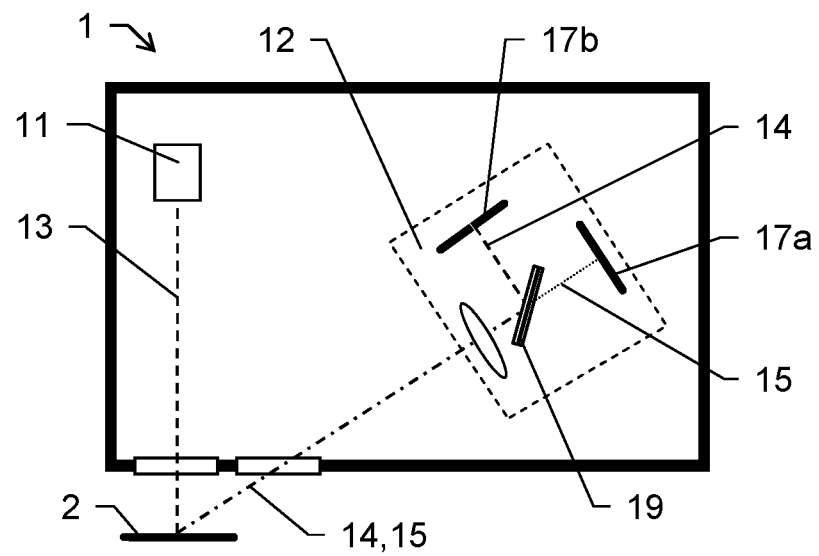
FIG. 5 shows a further embodiment of a measuring device according to the invention for measuring an object.

FIG. 5 shows a further embodiment of a measuring device 1 according to the invention for measuring an object 2. The embodiment differs from that of FIG. 4 with respect to the construction of the detector 12.

The detector 12 comprises two sensors 17a and 17b. Furthermore, the detector 12 comprises a beam splitter 19, which is in particular dichromatic and/or dichroic. The beam splitter 19 provides a wavelength-selective separation of the reflected measurement radiation 14 incident in the detector 12 from the fluorescent light 15 which is also incident. The reflected measurement radiation 14 is deflected by means of the beam splitter 19 onto the sensor 17b. The fluorescent light 15 can be transmitted by the beam splitter 19 (at least in substantial parts) and can be detected using the sensor 17a (as an image). Alternatively, it is conceivable that the beam splitter is designed for a transmissivity of light only in the wavelength range of the measurement radiation.

Using this arrangement, both a measurement based on emitted fluorescent light 15 and also a measurement based on reflected measurement light 14 can be carried out. Both measurement options can be operated separately, for example, alternately over time, or in combination, for example, simultaneously.

Figure 6:
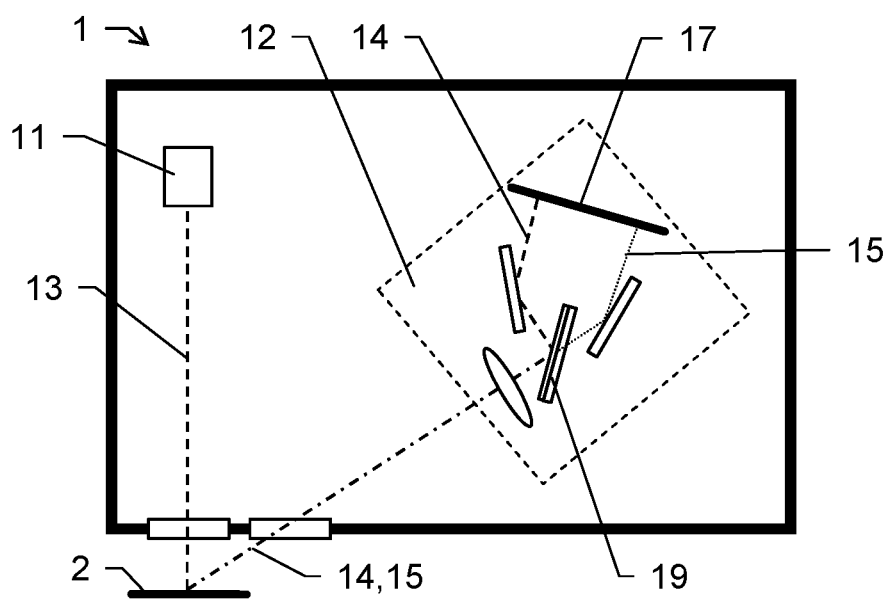
FIG. 6 shows a further embodiment of a measuring device according to the invention for measuring an object.

FIG. 6 shows a further embodiment of a measuring device 1 according to the invention for measuring an at least partially transparent or reflective object 2. The embodiment differs from that of FIG. 5 with respect to the construction of the detector 12.

In this case, the detector 12 comprises a single sensor 17 and a beam splitter 19. The signals (fluorescence 15 and reflection 14) are separated by means of the beam splitter 19. The respective separated signals are deflected by deflection elements (for example, mirrors) onto the single sensor 17, but onto different detection regions of the sensor 17. Both the fluorescent radiation 15 and also reflected radiation 14 can thus be detected as an image using the one sensor 17.

Using the one sensor 17, because of the spatially separated signal detection, an image, i.e., a profile of the beam reflection or the beam emission on the object, can be detected for each signal. The topography of the object 2 can then be computed in a punctiform manner with respect to this line on the basis of the line curve in the image.

Figure 7:
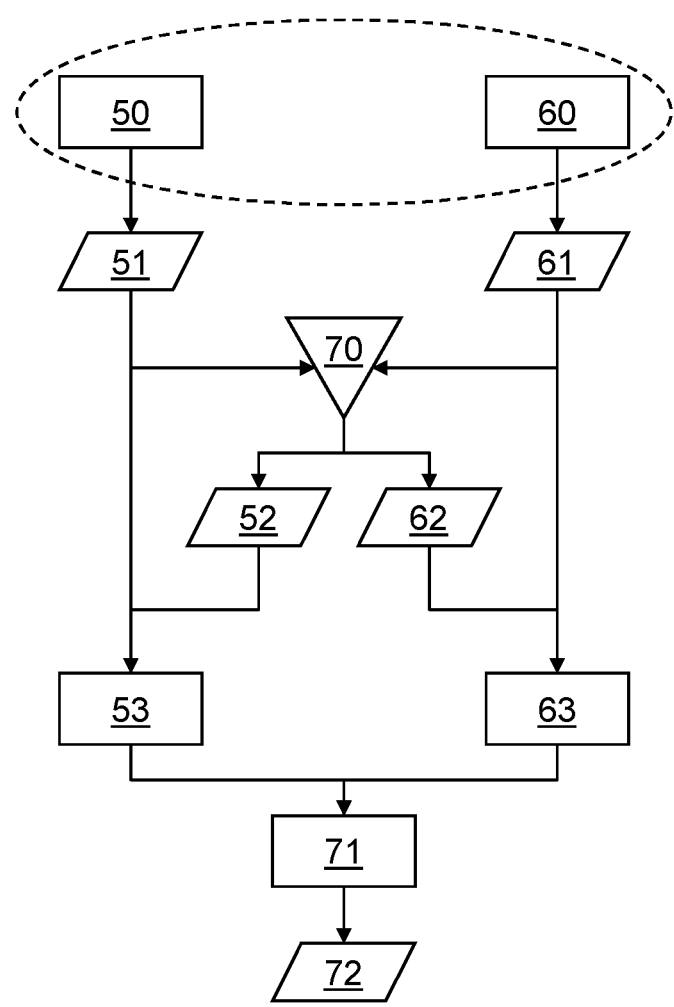
FIG. 7 shows an embodiment of a measuring strategy according to the invention using a hybrid triangulation scanner according to the invention.

FIG. 7 shows an embodiment of a measuring strategy according to the invention using a hybrid triangulation scanner according to the invention, in particular according to a construction as shown in one of FIGS. 1 to 6.

A hybrid triangulation scanner is understood as a measuring device, which is designed both for emitting measurement radiation and detecting reflected measurement radiation and also for emitting fluorescence-exciting radiation (this can be identical to the measurement radiation, in particular with respect to the wavelength) and detecting fluorescent light. Respective distance measured data can be generated both by the detection of the reflected measurement radiation and also by the detection of the fluorescent light, i.e., for example, a distance to an object can be determined.

The measurement radiation can be emitted in each case in the form of a line. Therefore, measured data can be derived with respect to the entirety of the line. Distances may be computed from the form (curve) and the location of the line in an image detected at the sensor on the basis of the known relative positioning of beam source and detector and on the basis of a preceding calibration of the sensor.

The line can be moved in relation to the object over its surface, i.e., the object can move in relation to the scanner, the scanner can be moved in relation to the object, or the scanner comprises a deflection device, which enables a movement of the lines. The object surface can be detected by scanning in this way.

To detect an object surface, on the one hand, a triangulation measurement is carried out by means of reflection of measurement radiation 50, wherein corresponding reflection image data 51 are generated.

On the other hand, to detect the object surface, a (further) triangulation measurement is carried out by means of induction of fluorescence 60 and detection of the light resulting in this case, wherein corresponding fluorescence image data 61 are generated.

These two raw data sets (reflection image data 51, fluorescence image data 61) are jointly processed and a (virtual)

segmentation 70 of the object surface into reflective and fluorescent regions is carried out on the basis of the overall processing, in particular automatically using a correspondingly implemented algorithm. For this purpose, for example, an averaging of signal intensities can be carried out.

Corresponding masks 52 and 62 can be derived for the surface regions having respective reference to one of the measurement methods. Together with the raw data sets, both a reflection point cloud 53 (for a diffusely reflective surface region) and also a fluorescence point cloud 63 (for a transparent or reflective surface region) can then be generated.

In a downstream combination step 71, the point clouds 53 and 63 can be fused to form an overall point cloud 72. In this way, a point cloud 72 is obtained which represents both diffusely reflective parts of the object surface and also transparent or reflective parts of the surface, i.e., is capable of representing a relevant object in its entirety.

In general, reflection measured data can be embodied by the reflection image data 51 and/or the reflection point cloud 53. Fluorescence measured data can accordingly be embodied by the fluorescence image data 61 and/or the fluorescence point cloud 63.

It is obvious that these illustrated figures only schematically illustrate possible exemplary embodiments. According to the invention, the various approaches can also be combined with one another and with methods for triangulation measurement or fluorescence measurement of the prior art.

What is claimed is:

1. A measuring device for measuring an object, wherein the measuring device comprises:
   a distance measuring unit having:
   a beam emission unit configured for generating a measurement radiation having a defined wavelength spectrum, and
   a detector configured for detecting the measurement radiation reflected on the object surface, the detector having at least one first sensor,
   wherein the distance measuring unit is configured to generate distance measured data and reflection measured data as first distance measured data by emitting the measurement radiation and detecting the reflected measurement radiation according to the principle of triangulation,
   wherein the measurement radiation has a wavelength spectrum such that a fluorescence is excited by an interaction of the measurement radiation with the object material to cause the emission of fluorescent light,
   wherein a spectrum of the fluorescent light and the wavelength spectrum of the measurement radiation are different,
   wherein the detector is designed for detecting the fluorescent light, and
   wherein fluorescence measured data is generated as second distance measured data based on the detection of the fluorescent light according to the principle of triangulation.

2. The measuring device according to claim 1, wherein a center wavelength of the wavelength spectrum is selected from a range between 250 nm and 500 nm.

3. The measuring device according to claim 1, wherein the detector comprises a first optical filter component and the first optical filter component, in cooperation with the first sensor, provides a wavelength-dependent separation of reflected measurement radiation and fluorescent light.

4. The measuring device according to claim 1, wherein the detector comprises a second optical filter component and the second optical filter component is designed as a two-part alternating filter having a first and a second filter region, wherein
   the first filter region provides a substantially exclusive transmissivity with respect to the wavelength spectrum,
   the second filter region provides a transmissivity with respect to a spectrum of the fluorescent light, and
   the first and the second filter regions are alternately positioned in a field of view of the first sensor.

5. The measuring device according to claim 1, wherein the beam emission unit comprises a first and a second beam source and the measurement radiation is generated as a composition of the measurement radiation that is generated using the first beam source having the defined wavelength spectrum and a further measurement radiation generated using the second beam source.

6. The measuring device according to claim 1, wherein the detector comprises a second sensor and is configured in such that the reflected measurement radiation is detectable using the first sensor and the fluorescent light is detectable using the second sensor.

7. The measuring device according to claim 1, wherein the detector comprises a beam splitter and the beam splitter is dichroic for the wavelength-dependent separation of the reflected measurement radiation from the fluorescent light.

8. The measuring device according to claim 1, wherein the at least one first sensor comprises a first and a second detection region and the detector is configured such that the reflected measurement radiation is detectable by interaction with the first detection region and the fluorescent light is detectable by interaction with the second detection region.

9. The measuring device according to claim 8, wherein the control and processing unit has a data fusion functionality configured such that upon its execution:
   the detection of the measurement radiation and the fluorescent light is continuously monitored,
   a respective item of intensity information for the respective detection of the measurement radiation and the fluorescent light is continuously derived, and
   a point cloud representing the object surface is generated by selective processing of the reflection measured data and the fluorescence measured data based on the intensity information.

10. The measuring device according to claim 1, wherein the measuring device comprises a control and processing unit configured to:
    generate and emitting the measurement radiation,
    scan illuminating the object region using the measurement radiation,
    detect the measurement radiation reflected on the surface, and
    generate reflection measured data as first distance measured data based on the detection of the reflected measurement radiation according to the principle of triangulation.

11. The measuring device according to claim 10, wherein the control and processing unit comprises a switchover functionality configured such that upon its execution:
    the measurement radiation or the fluorescent light is continuously detected,
    corresponding reflection measured data or fluorescence measured data, respectively, are generated,
    the detection of the measurement radiation or the fluorescent light is continuously monitored with respect to a signal intensity,
    the signal intensity is continuously compared to a defined threshold value, and a switchover takes place between the detection of the measurement radiation and the detection of the fluorescent light in dependence on the comparison.

12. The measuring method according to claim 11, wherein:
the reflection measured data and the fluorescence measured data are analyzed depending on the location with respect to the respective quality thereof in regard to the detection of the object region,
a segmentation of the object region is carried out based on the analysis, and
a combination of at least a part of the reflection measured data and of at least a part of the fluorescence measured data is carried out based on the segmentation.

13. A measuring method for measuring an object comprised of a material which fluoresces with respect to a known wavelength range, the measuring method comprising:
generating and emitting a measurement radiation having a defined wavelength spectrum;
scanning illuminating of an object region using the measurement radiation;
detecting the measurement radiation reflected on the surface; and
generating reflection measured data as first distance measured data based on the detection of the reflected measurement radiation according to the principle of triangulation, wherein:
the measurement radiation has a wavelength spectrum such that in the scope of the scanning illumination, a fluorescence is excited due to an interaction of the measurement radiation with the object material, and fluorescent light is emitted at the object,
the fluorescent light is detected, and
fluorescent measured data are generated as second distance measured data based on the detection of the fluorescent light according to the principle of triangulation.

14. The method according to claim 13, wherein:
a reflection point cloud is generated based on the reflection measured data,
a fluorescence point cloud is generated based on the fluorescence measured data, and
a representation of the object surface is generated by a combination of the reflection point cloud and the fluorescence point cloud.

15. A computer program product, which is stored on a non-transitory machine-readable carrier for controlling or executing a method comprising:
generating and emitting a measurement radiation having a defined wavelength spectrum;
scanning illuminating of an object region using the measurement radiation;
detecting the measurement radiation reflected on the surface; and
generating reflection measured data as first distance measured data based on the detection of the reflected measurement radiation according to the principle of triangulation,
wherein:
the measurement radiation has a wavelength spectrum such that in the scope of the scanning illumination, a fluorescence is excited due to an interaction of the measurement radiation with the object material, and fluorescent light is emitted at the object,
the fluorescent light is detected, and
fluorescent measured data are generated as second distance measured data based on the detection of the fluorescent light according to the principle of triangulation.

* * * * *